United States Patent

[11] 3,589,485

| [72] | Inventors | Sadayuki Kajitani;<br>Masahiro Yokoyama, both of Nagoya, Japan |
|---|---|---|
| [21] | Appl. No. | 840,152 |
| [22] | Filed | July 9, 1969 |
| [45] | Patented | June 29, 1971 |
| [73] | Assignee | Mitsubishi Denki Kabushiki Kaisha<br>Tokyo, Japan |
| [32] | Priority | July 12, 1968 |
| [33] | | Japan |
| [31] | | 43/59362 |

[54] CLUTCH MOTOR
7 Claims, 3 Drawing Figs.

[52] U.S. Cl. ................................................. 192/18 B,
192/12 B, 310/78, 310/153
[51] Int. Cl. ............................................... F16d 13/22
[50] Field of Search .......................................... 310/76, 74,
77, 78, 66, 68, 83, 153, 93, 108; 192/18.2, 12.2,
3.5 E

[56] References Cited
UNITED STATES PATENTS

| 2,827,990 | 3/1958 | Hunt | 310/76 |
| 3,174,450 | 3/1965 | Becker | 192/18.2 |
| 3,217,195 | 11/1965 | Ferranti | 310/76 |
| 3,352,396 | 11/1967 | Moseley | 192/18.2 |
| 3,387,157 | 6/1968 | Cook | 310/76 |
| 3,404,767 | 10/1968 | Farnum | 192/18.2 |
| 3,410,380 | 11/1968 | Kooistra | 192/18.2 |
| 3,473,638 | 10/1969 | Brucken | 192/3.5 |
| 3,476,962 | 11/1969 | Fauth | 310/76 |

Primary Examiner—Milton O. Hirshfield
Assistant Examiner—R. Skudy
Attorneys—Robert E. Burns and Emmanuel J. Lobato ABSTRACT: A clutch motor arrangement having a lever for moving the clutch wheel for engaging and disengaging the clutch wheel from a flywheel on an electric motor. The arrangement includes the electromagnets which can be energized independently of the lever. The clutch wheel is engaged with the flywheel for the purpose of adjusting either a position where the associated driven machine is to stop or its speed.

PATENTED JUN29 1971  3,589,485

1

CLUTCH MOTOR

BACKGROUND OF THE INVENTION

This invention relates to improvements in a clutch motor.

The conventional type of clutch motors has only included the single operating route externally controlled by the associated operating lever to selectively actuate the clutch and brake and it has been difficult to adjust the operation of the clutch or brake in accordance with an externally applied electrical instruction and regardless of manual control of the clutch or brake. Therefore if it is required to adjust a position where the associated driven machine is to be ultimately stop then it has been generally forced to bring the driven machine into its mode of operation not constrained by the motor through the utilization of a slight time interval within which the operation switches from the clutching to braking mode or vice versa with a high skill of operation and to manually determine the particular position where the driven machine is to stop. Alternatively the clutching and braking operations have completely performed by electrical means with all the manual operations eliminated.

In the former event, expensive labor and time has been consumed for adjusting the determination of position and particularly those operations required to be frequently adjusted in the determination of position greatly decrease in efficiency of production. In the latter event, it has been very difficult to effect the delicate adjustment of the clutch to perform the partly clutching operation, the cushioned start operation or the like fitted for the details of the particular operation.

SUMMARY OF THE INVENTION

Accordingly it is an object of the invention to provide a clutch motor including new and improved electromagnetic means for selectively performing the clutching and braking operations in which the above-mentioned disadvantages are eliminated.

The invention accomplishes this and other objects that will become apparent as the description proceeds by the provision of a clutch motor comprising an electric motor, a flywheel operatively connected to the electric motor, a clutch wheel normally spaced away from the flywheel and engageable by the latter, a brake plate normally engaging that surface of the clutch wheel remote from the flywheel, a sleeve-type bearing having connected thereon the clutch wheel and axially movable, a compression spring for normally pushing the movable bearing in a predetermined direction, an operating lever operatively coupled to the movable bearing to move it in the predetermined direction and in the direction opposite thereto, and at least one electromagnet unit operatively connected to the movable bearing, characterized in that the electromagnet unit includes a movable iron core so connected to the movable bearing that when the electromagnet unit is energized the movable iron core is operative to move the movable bearing in the direction opposite to the predetermined direction against the action of the compression spring while the operating lever is disabled to move the movable bearing during the energization of the electromagnet unit.

Preferably the operating lever may have one end in the form of a yoke provided with a pair of opposed control pins and the sleeve-type movable bearing may include a pair of opposite holes into which the control pins extend to normally form a play on that side thereof remote from the clutch wheel sufficient to permit the clutch wheel to engage the flywheel.

BRIEF DESCRIPTION OF THE DRAWING

The invention will become apparent from the following detailed description taken in conjunction with the accompanying drawing in which.

DESCRIPTION OF THE PREFERRED EMBODIMENT

Figure 1:
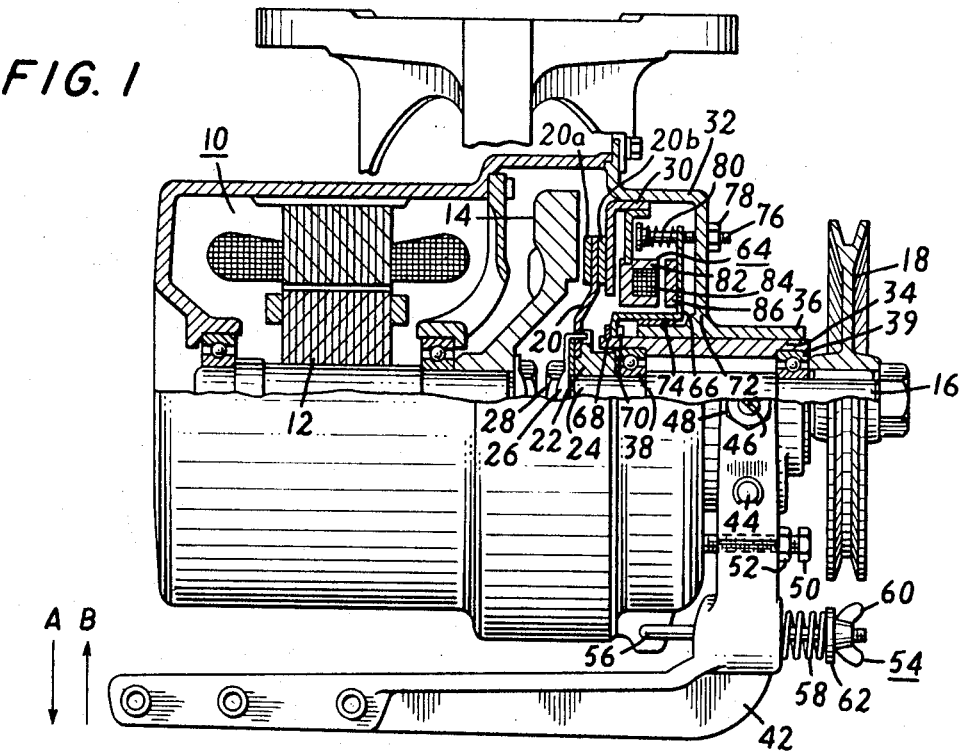
FIG. 1 is an elevational view, partly in longitudinal section, clutch motor constructed in accordance with the principles the invention.

Referring now to the drawing and FIG. 1 in particular, it is seen that an arrangement disclosed herein comprises an electric motor of hub conventional construction generally designated by the reference numeral 10 and including a rotary shaft 12 having rigidly mounted to one end thereof an input member in the form of a flywheel 14 exhibiting the inertia effect. An output member or shaft 16 is disposed in axially aligned and spaced relationship with the rotary motor shaft 12 and provided at that end thereof remote from the rotary shaft 12 with a driving pulley 18 adapted to be operatively coupled to a load (not shown). A clutch wheel 20 is disposed in opposite relationship with the flywheel 14 by having its hub portion 22 rigidly secured on the output shaft 16 at that end portion adjacent the rotary shaft, through a key 24 and a washer 26 by a nut 28 screw threaded onto the said end portion of the output shaft. The clutch wheel 20 has attached to the opposite surfaces of the outer peripheral portion thereof a pair of friction annuli or facings 20a and b respectively, with one of the annulus 20a facing and normally spaced away from the operating surface of the flywheel 14 and with the other friction annulus 20b normally engaging an annulus brake disc 30. The brake disc 30 is suitably fixed to a bracket 32.

As shown in FIG. 1, a sleeve-type movable bearing 34 is fitted into an axial portion 36 in the form a hollow cylinder extending from the central portion of the bracket 32 and coaxially with the output shaft 16 for limited axial movement and also has the output shaft 16 rotatably carried therein through a pair of spaced ball bearings 38 and 39. The sleeve-type movable bearing 34 is provided on that end portion remote from the clutch wheel 20 with a pair of circular holes 40 (see FIG. 2) located in diametrically opposite relationship.

Figure 3:
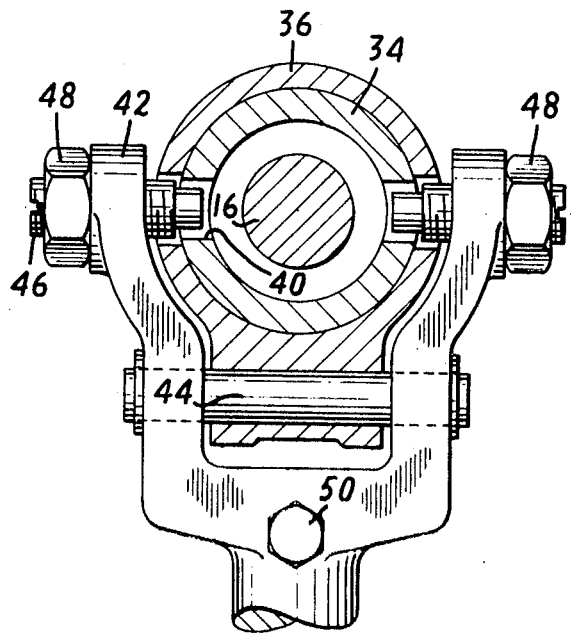
FIG. 3 is an enlarged front elevational view, partly in cross section, of the arrangement illustrated in FIG. 2.

In order to move the sleeve-type bearing 34 and therefore the output shaft 16 toward and away from the rotary motor shaft 12, an operating L-shaped lever 42 is disposed outside a housing for the clutch motor. More specifically, the L-shaped lever 42 has one arm pivotably mounted on a pivot pin 44 suitably fixed to the bracket 32 and including a free end portion in the form of a yoke (see FIG. 3). Thus the lever 42 forms a linkage mechanism about the axis of the pivot pin 44. As best shown in FIG. 3, a pair of opposite control pins or yoke's screws 46 are adjustably screw-threaded into both legs of the yoked end portion of the lever 42 until they extend into the respective holes 40 for relative movement therebetween. Then the screw 46 is locked in place to either of the yoke's legs by a locknut 48.

Figure 2:
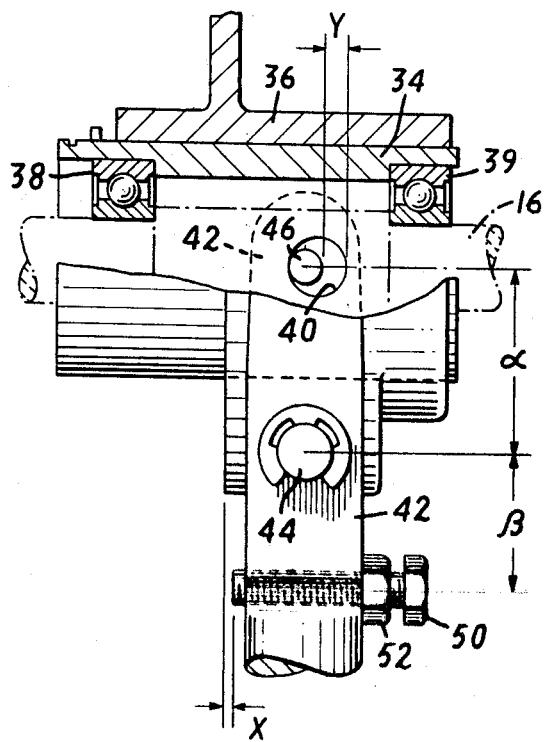
FIG. 2 is an enlarged fragmental elevational view illustrating partly in longitudinal section, the manner in which the operating lever engages the sleeve type movable bearing for the clutch shown in FIG. 7.

FIGS. 2 and 3 illustrate the manner in which the yoke's screws 46 are operatively coupled to the sleeve-type movable bearing 34. As best shown in FIG. 2, a free play "Y" is normally formed between the yoke's screw 46 and the hole 40 on that side of the screw remote from the clutch wheel 20 with the opposite side of the screw contacting the adjacent wall portion of the hole. The one arm of the lever 42 further has a stop or control bolt 50 adjustably screw-threaded thereinto below the pivot pin 40 and locked in place thereto by a locknut 52. The stop bolt 50 serves to limit the rotational movement of the lever 42 toward the clutch motor. That is, the stop bolt 50 abuts against the adjacent portion of the bracket 32 in the normal position of the lever 42.

The lever 42 is also operatively coupled to a spring operated reset mechanism generally designated by the reference numeral 54. This reset mechanism 54 includes an L-shaped pull rod 56 suitably fixed at one end of one arm of the "L" to the bracket 32 and having the other arm portion loosely extending through the one arm of the lever 42, a compression spring 58 disposed around the other arm thereof and an adjusting butterfly nut 60 screw-threaded onto the free end portion of the other arm thereof to push the spring 58 against the lever 42 through a washer 62.

A plurality of electromagnetically operating mechanisms or electromagnet units generally designated by the reference numeral 64, by which the invention as characterized, are disposed on and spaced away from that side of the brake disc 30 remote from the clutch wheel 20. The electromagnet units 64 each include a yoke plate 66 of nearly Z-shaped cross section having one end fixed to the sleeve-type movable bearing 34 at that end adjacent the clutch wheel 20 by means of a retaining ring 68 and a radial protrusion 70 in the form of a circular annulus with the other end portion of the plate substantially parallel to that radial wall portion 72 of the bracket 32. The yoke plate 66 is movably supported on the axial bracket portion 36 through a guide ring 74 and has a pull rod 76 loosely extending therethrough and screw-threaded into and fixed in place on the radial bracket portion 72 by a locknut 78. A compression spring 80 is disposed around the pull rod 76 between the yoke plate 66 and that end of the rod remote from the nut 78 to bias the yoke plate 66 and therefore the sleeve-type movable bearing 34 in a predetermined direction in which it tends to be moved away from the clutch wheel 20.

Each of the electromagnet units 64 further comprises a stationary iron core 82 of L-shaped cross section suitably fixed to the brake disc 30, an exciting winding 84 disposed within the stationary core 82, and a movable iron core 86 attached to the above-mentioned other end portion of the yoke plate 66 so as to be disposed in opposite relationship with the stationary core 82 to form an airgap of a predetermined width therebetween.

The arrangement thus far described is operated as follows: The motor 10 continues to be rotated. If the other arm of the lever 42 is pulled in the direction of the arrow A shown in FIG. 1 against the action of the reset spring 58, then the yoke's screws 46 are moved about the axis of the pivot pin 44 to move the sleeve-type bearing 34 toward the rotary motor shaft 12 against the action of the spring 58 thereby to move the clutch wheel 20 toward the flywheel 14 through the ball bearing 38 and the hub portion 22 of the clutch wheel 20 until the friction annulus 20b on the clutch wheel 20 disengages from the brake disc 30 while the friction annulus 20a on the same wheel engages the operating surface of the flywheel 14. This permits the rotational movement of the rotary motor shaft 12 to be transmitted to the output shaft 16 through the flywheel 14 and the clutch wheel 20 whereupon the driving pulley 18 on that shaft 16 drives the associated driven machine at a high speed that is, at the normal speed.

Under these circumstances, the release of the lever 42, the outer arm thereof is moved in the direction of the arrow B shown in FIG. 1 until it is reset to its original position where the stop bolt 50 abuts against the bracket 32 to limit the return stroke of the lever 42. That is, the distance X as shown in FIG. 2 is null.

It is now assumed that $\delta$ represents a distance between either of the friction annuli 20a or b on the clutch wheel 20 and the operating surface of the associated one of the flywheel and brake disc 14 or 30 and that the friction annuli 20a and b are permitted to wear away by thicknesses of $\Delta_1$ and $\Delta_2$ respectively. Under this assumed condition the maximum free play Y of the yoke's screw 46 within the recess 40 should hold the following inequality.

$$Y > \delta + \Delta_1 a 8 z \Delta_2$$

It is further assumed that with the friction clutch annuli 20a and b not yet subject to wear, when the other arm of the lever 42 has moved in the direction of the arrow A (see FIG. 1) such a distance that the friction annulus 20b on the clutch wheel 20 is about to disengage from the brake disc 30, the free end of the stop screw 50 on the lever 42 is spaced away from the adjacent portion of the bracket 32 by a distance of "X" as illustrated in FIG. 2. Then the distance X is preferably selected to hold the equation $$X = (\beta/\alpha)\Delta_2$$

where $\alpha$=distance between the common axis of the yoke's screws 46 and the axis of the pivot pin 42.

$\beta$=distance between the axis of the stop pin 50 and the axis of the pivot pin 42. (see FIG. 2)

The resetting of the lever 42 as above described is accompanied by the clutch wheel 20 disengaging from the flywheel 14 and engaging the brake disc 30 resulting in the stoppage of the output shaft 16 and therefore the associated driven machine (not shown).

At the instant the output shaft 16 has been stopped or in its stopping operation the electromagnet units 64 are adapted to be energized. To this end, any suitable electrical signal can be applied to a suitable switch (not shown) for the electromagnet units 64 to permit the associate source of electric power to supply electrical energy to the exciting windings 84 whereupon the stationary and movable iron cores 82 and 86 respectively have a closed magnetic path formed in the material therefor as shown at dotted line in FIG. 1. Therefore the movable core 86 is attracted by the stationary core 82 thereby to move the sleeve-type bearing 34 toward the flywheel 14 through the yoke plate 66 and the retaining ring 68 and against the action of the spring 80 until the clutch wheel 20 engages the flywheel 14. In this connection it is to be noted that the movable core 86 is spaced away from the stationary core 82 by a distance substantially equal to the dimension "Y" as previously described. The engagement of the clutch wheel 20 with the flywheel 14 causes the rotational movement of the rotary motor shaft 12 to be transmitted to the output shaft 16 circumstances, therefore the associated driven machine (not shown). Under these circumstances, the operating lever 42 may be in its reset position but it is to be noted that the movable bearing 34 is permitted to be freely moved toward the rotary motor shaft 12 without the yoke's screws 46 constraining the movement of the bearing. This is because each hole 40 on the sleeve-type movable bearing 34 having the yoke screws 46 engaging the same has the gap Y formed on that side of the yoke's screw 46 remote from the clutch wheel or the right-hand side thereof as viewed in FIG. 2 which has been previously described.

From the foregoing it will be appreciated that when the associated driving machine has been stopped through the release of the lever 42 or in the process of stopping it and if the machine does not reach its predetermined position or speed that the electromagnet units 64 can respond to the particular electrical signal applied there to be excited to cause the driving machine to perform the inching or partly clutched mode of operation under electrical control of the same whereby the machine is permitted to be adjusted in position or speed.

What we claim is:

1. In a clutch motor, the combination of an electric motor, a flywheel operatively connected to said electric motor, a clutch wheel normally spaced away from said flywheel and engageable by the latter, a brake place normally engaging that surface of said clutch wheel remote from the flywheel, an axially movable sleeve type bearing having connected thereon said clutch wheel, a compression spring for normally urging said movable bearing in a predetermined direction, an operating lever coupled to said movable bearing operable to move same in said predetermined direction and the direction opposite thereto, and at least one electromagnet unit including a movable iron core connected to said movable bearing effective when energized to move said movable bearing in said opposite direction against the action of said compression spring while said operating lever is disabled.

2. A clutch motor as claimed in claim 1, wherein said operating lever has one end in the form of a yoke provided with a pair of opposite control pins and said sleeve-type movable bearing includes means defining a pair of opposite holes into which said control pins extend to normally form a free play on the side thereof remote from the clutch wheel sufficient to permit the clutch wheel to engage the flywheel.

3. In combination: a rotationally driven input member rotatable about a longitudinal axis; a stationary braking surface spaced apart from said input member along said longitudinal axis; a clutch disc having friction facings on each side thereof movable disposed between said input member and said braking surface; an output member connected to said clutch disc for movement therewith; mounting means mounting said clutch disc and output member for both rotary movement together about said longitudinal axis and translational movement together along said longitudinal axis between a first working position wherein said clutch disc frictionally engages with said input member and a second working position wherein said clutch disc frictionally engages with said braking surface; mechanical means for mechanically moving said clutch disc to said first and second working positions; and electromagnetic means electromagnetically effecting movement of said clutch disc to said first working position independently of said mechanical means.

4. A combination according to claim 3; wherein said mechanical means comprises a pivotally mounted operating lever connected to said mounting means, means mounting said operating lever for pivotal movement in one direction to one position to effect movement of said clutch disc and output member to said first working position and in the opposite direction to another position to effect movement of said clutch disc and output member to said second working position, and biasing means for normally biasing said operating lever in said opposite direction; and wherein said electromagnetic means comprises at least one magnetic member, means mounting said magnetic member for translational movement with said clutch disc and output member, and means spaced-apart from said magnetic member for selectively creating a magnetic flux coacting with said magnetic member to effect movement of said clutch disc and output member to said first working position.

5. A combination according to claim 4; wherein said mounting means includes a sleeve bearing disposed around a portion of said output member, means mounting said sleeve bearing for translational movement along said longitudinal axis, and means mounting said clutch disc and output member for translational movement with said sleeve bearing and rotary movement relative to said sleeve bearing; means connecting said operating lever to said sleeve bearing to effect translational movement of same in response to pivotal movement of said operating lever; and means connecting said magnetic member to said sleeve bearing to effect translational movement of same in response to said magnetic flux.

6. A combination according to claim 5; including means defining a pair of holes in said sleeve bearing, and a pair of pins on said operating lever each positioned in one of said holes and cooperative therewith to effect translational movement of said sleeve bearing in response to pivotal movement of said operating lever, said holes being sufficiently oversized with respect to said pins to permit translational movement of said sleeve bearing by said electromagnetic means when said operating lever is in said another position.

7. A combination according to claim 6; wherein said rotationally driven input member comprises an electric motor and a flywheel having a surface portion frictionally engageable with said clutch disc rotationally driven by said electric motor.